United States Patent
Huber et al.

(10) Patent No.: US 7,662,499 B2
(45) Date of Patent: Feb. 16, 2010

(54) PLATE ELEMENTS FOR FUEL CELL STACKS

(75) Inventors: Markus Huber, Grafing (DE); Christian Ruf, Munich (DE)

(73) Assignee: SFC Smart Fuel Cell AG, Brunnthal-Nord (DE)

( * ) Notice: Subject to any disclaimer, the term of this patent is extended or adjusted under 35 U.S.C. 154(b) by 895 days.

(21) Appl. No.: 10/523,308

(22) PCT Filed: Jul. 29, 2003

(86) PCT No.: PCT/EP03/08373

§ 371 (c)(1), (2), (4) Date: Aug. 18, 2005

(87) PCT Pub. No.: WO2004/013923

PCT Pub. Date: Feb. 12, 2004

(65) Prior Publication Data
US 2006/0127739 A1    Jun. 15, 2006

(30) Foreign Application Priority Data
Jul. 31, 2002    (EP) .................................. 02016923

(51) Int. Cl.
H01M 8/02    (2006.01)
H01M 8/10    (2006.01)
(52) U.S. Cl. .............................. 429/34; 429/38; 429/39
(58) Field of Classification Search .................. 429/34, 429/38, 39
See application file for complete search history.

(56) References Cited

U.S. PATENT DOCUMENTS

| | | | |
|---|---|---|---|
| 3,134,696 A | 5/1964 | Douglas et al. | |
| 5,863,671 A | 1/1999 | Spear et al. | |
| 6,066,408 A * | 5/2000 | Vitale et al. | 429/26 |
| 6,174,616 B1 * | 1/2001 | Marvin et al. | 429/34 |
| 2003/0175574 A1 | 9/2003 | Dohle et al. | |
| 2006/0127741 A1 * | 6/2006 | Muller et al. | 429/38 |

FOREIGN PATENT DOCUMENTS

| | | |
|---|---|---|
| DE | 10040654 A1 | 3/2002 |
| EP | 0281949 A1 | 9/1988 |
| EP | 0959511 A2 | 11/1999 |
| EP | 0975039 A2 | 1/2000 |
| EP | 1220347 A2 | 7/2002 |
| EP | 1429406 A1 * | 6/2004 |
| JP | 63236268 A * | 10/1988 |
| JP | 05029001 A | 2/1993 |
| JP | 08138699 A | 5/1996 |
| JP | 09134732 A | 5/1997 |
| JP | 10162842 A | 6/1998 |
| JP | 11510637 | 9/1999 |

(Continued)

Primary Examiner—Gregg Cantelmo
(74) Attorney, Agent, or Firm—IP Strategies

(57) ABSTRACT

The invention relates to a plate element for a fuel cell stack which comprises a frame region and at least one inner region which is surrounded by the frame region. In addition, it has a plurality of webs which extend from the frame region into the at least one inner region and define a flow guidance structure in the at least one inner region, in which at least four bore holes are in the frame region of which at least two are connected with the flow guidance structure.

18 Claims, 6 Drawing Sheets

| | FOREIGN PATENT DOCUMENTS | | | WO | WO-9637005 | 11/1996 |
|---|---|---|---|---|---|---|
| JP | 200036310 A | 2/2000 | | WO | WO-9723006 | 6/1997 |
| JP | 2000100457 A | 4/2000 | | WO | WO-9813891 | 4/1998 |
| JP | 2001297778 A | 10/2001 | | | | |

* cited by examiner

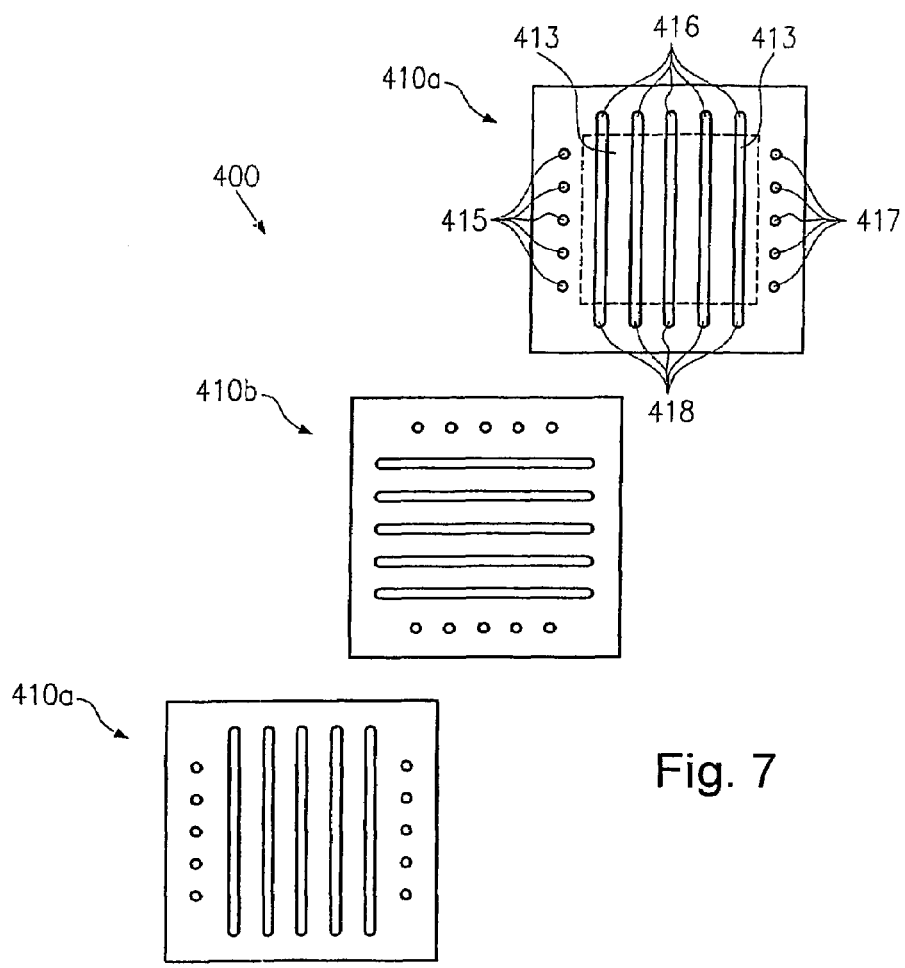
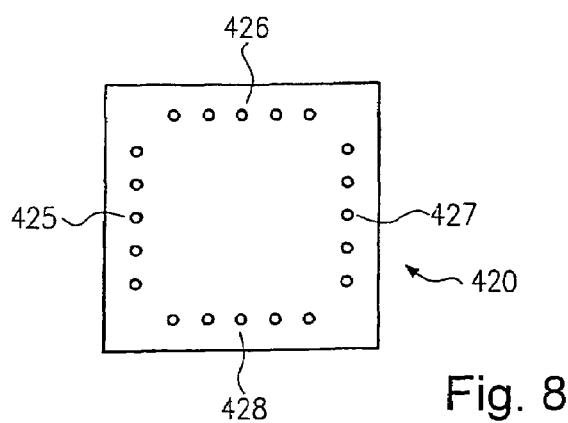
Fig. 7
Fig. 8

PLATE ELEMENTS FOR FUEL CELL STACKS

The invention relates to plate elements for fuel cell stacks in a monopolar or bipolar arrangement. In particular, the invention relates to fluid-carrying electrical conductors and elements to be installed between the electrical conductors to insulate these electrically.

BACKGROUND OF THE INVENTION

The differences between a bipolar arrangement and a monopolar arrangement can be shown most easily using the equivalent circuit diagrams that are provided in FIG. 1.

The bipolar arrangement corresponds to the upper part of the figure, which shows a series connection of individual voltage cells. The cells are placed together in such a way that a plus pole and minus pole are opposite each other in each case, which allows a simple switching of the voltage cells. This is the arrangement used, for example, to position the chambers of a lead accumulator, to insert the batteries into a torch or to position the fuel cell units in a bipolar stack.

The monopolar arrangement is that shown in the lower part of the figure. With this arrangement, the cells are placed together in such a way that two plus poles or two minus poles are opposite each other, in pairs, each time. In order to switch the individual voltage cells in series here, a comparatively complicated switching is necessary, and so such an arrangement of individual cells in most applications would not have any advantage over the bipolar arrangement. However, this does not apply for fuel cell stacks: advantages can also be achieved here with a monopolar arrangement, as will be explained below referring to FIG. 2.

Within a bipolar stack, every cathode has two neighbouring anodes and must be sealed against these to prevent fluid transfers. Within a cell, this is done in the interaction of electrolyte material (inside) and seals (outside). The separation between the neighbouring cells is made in each case through a separating plate, one side of which forms the cathode chamber and the other side of which forms the anode chamber. The fluid passages in the separating plates are formed in such a way that the cathode fluid from the one side (cathode side) does not come into contact with the anode fluid from the other side (anode side).

In a monopolar arrangement, on the other hand, anode and cathode pairs are formed. Indeed, the cathodes and anodes within such a pair must be electrically insulated from each other, but the fluid regions themselves do not need to be separated as long as the electrical conductivity of the cathode and anode fluids remains negligible (which is generally the case in spite of a certain conductivity, especially of the anode fluid). Two cathodes can therefore be grouped together in each case into one cathode chamber, and two anodes into one anode chamber.

FIG. 2 shows an exploded view of such an anode chamber. An arrangement of this type is described, for example, in DE 100 40 654 A1. An electrically insulating frame element 1 is sandwiched between two current collectors 2. The current collectors in turn border on electrolyte devices (MEA) (not shown in the figure). The current collectors 2 are used for current removal at the MEA-current collector interface, but at the same time should not noticeably reduce the contact surface of the anode fluid with the MEA: for this reason, the inner region of a current collector 2 is bridged with thin transverse webs which are sufficiently wide and numerous for current removal, but are so narrow that the active contact surface of the fluid with the MEA defined by the recesses 4 is not substantially reduced.

To guide the flow along the stack axis, four bore holes 5 are provided in the frame region (in the corners in this case) of the electrical conductors, whereby in each case two diametrically opposed bore holes serve to guide the anode fluid and the cathode fluid. Corresponding bore holes 6, 7 are also provided in the frame element 1. The bore holes 7 are connected via openings with the inner region 8 of the frame element 1. The supply of anode fluid into the inner region 8 is via one of the two bore holes 7, and the removal via the other, diametrically opposed bore hole 7. The inner region 8 represents the main volume of the anode chamber of the cell shown, since the thickness of the frame element 1 is far greater than that of the current collector 2.

The statements made here for the anode chamber also apply correspondingly for the cathode chamber. With a cathode chamber, the central frame element has recesses at the two other diametric fluid openings. For this, the sketched type of frame elements 1 only needs to be turned around, so that only one type of frame elements is necessary for the building of the stack.

In the arrangement shown, the flow through the corner regions, which do not exhibit any intake or outlet, is much less than, for example, that through the central region of the anode chamber. In order to achieve a more even flow distribution within the chambers, net-like insertions (not shown in the figure) can be provided in the anode and cathode chambers. But even with these, the fluid exchange in the stagnation regions of the anode and cathode chambers is lower than along the intake-outlet section, so that the active surface available cannot be put to the best use. Stagnation regions of this type form in particular if the stack is not favourably positioned in terms of space.

BRIEF SUMMARY OF THE INVENTION

In view of these defects, it is an object of the present invention to provide improved stack elements which will overcome the disadvantages described above.

This object is solved by the plate element according to the invention with the features of claim 1 and the fuel cell stack assembly with the features of claim 11.

Advantageous further developments are given in the subclaims. Particularly preferred embodiments are described with reference to the attached figures.

The plate element according to the invention for a fuel cell stack comprises a frame region and at least one inner region which is surrounded by the frame region, a plurality of webs which extend from the frame region into the at least one inner region and, in the at least one inner region, define a flow guidance structure which is formed by recesses between the webs, and at least four bore holes in the frame region, at least two of which are connected with the flow field.

The term "plate element" aims to show that the item which is the object of the claim has clearly smaller dimensions in one spatial direction than in the two spatial directions at right angles to it. In the one spatial direction, the thickness of the plate elements can actually be so small that the plate element shows no intrinsic stability. The plate element according to the invention therefore also aims to include foils which are structured in accordance with the features described above.

The term "flow guidance structure" is understood to mean recesses between the webs or at least a cohesive structure of recesses between the webs which define a channel or a plurality of channels in the inner region of the plate element.

Each channel is (for example via openings through the frame region) connected with two bore holes, of which one is for the supply of fluid and the other for the removal of fluid. Through this at least one channel, the flow guidance structure is suitable for guiding (channeling) a fluid flow in the plane of the plate. To actually accommodate a fluid and guide the flow, the flow guidance structure naturally needs side restrictors which are provided by adjacent level surfaces of the adjoining stack elements (for example, those of the membrane electrode units).

To form several independent channels, the webs can be joined on both sides with the frame region. But the webs can also be joined just on one side with the frame region. In the simplest case, they have a straight tongue shape and run in a toothed arrangement, alternating from opposite sides of the frame region into the inner region of the plate element. Instead of straight tongues, more complex web shapes can also be used, such as "T"-shaped or "L"-shaped webs, which can also be positioned alternately to form a flow field.

The plate element is formed advantageously in such a way that it can be installed in different orientations at different positions of the fuel cell stack. The shape of the frame is therefore preferably square or rectangular. However, other shapes are also conceivable, which, if they are turned by less than 360°, congruently turn over on themselves, i.e. in particular the shapes of an equilateral triangle or other regular polygons, and also circles or ellipses.

The flow guidance structure may also be a plurality of channels running next to each other (for example, in parallel) within an inner region. Preferably, however, the flow guidance structure is formed, in an inner region surrounded by the frame region, by a meandering flow channel or, correspondingly in the case of several inner regions, by a plurality of such meandering flow channels. In this case, the entire inner region (except for the webs) can be evenly filled with fluids with the simplest possible fluid supply and fluid removal.

The flow guiding properties of the plate elements according to the invention mean that a locationally independent operation is possible without any loss of performance, whilst with the arrangement sketched in FIG. 2, in which the flow is not guided, fluid is only removed satisfactorily from out-of-the-way cathode or anode regions with the help of gravity. If used as a direct methanol fuel cell (DMFC), water can collect, for example, in less favourable operating positions on the cathode side and stop the oxygen needed for the reaction from being able to spread over the entire active surface. Secondly, the gaseous $CO_2$ produced on the anode can also lead to the blockage of the active surface of the anode if the gas cannot escape quickly upwards.

In a preferred embodiment, the plate element consists of a conductive material, such as graphite for example, but particularly preferably of a metal or a metallic compound. In this embodiment, the plate element can be used as the electrical conductor of a cell unit. Metals or metallic compounds are preferred since they are generally cheaper, easier to work and mechanically more stable and have a higher electrical conductivity than non-metallic materials. Metallic electrical conductors are also easier to contact electrically.

In a further preferred embodiment, the plate element consists of an insulating material. In this embodiment, the plate element can be used for the electrical insulation of neighbouring electrical conductors in monopolar arrangements.

In an advantageous further development, the plate element according to the invention is made as a laminate of a conductive layer and an insulating layer. If such laminates are used, the construction of the fuel cell stack is easier, since separate insulating units no longer need to be used. The layer thicknesses of the conductive layer and an insulating layer can be the same. The laminate can, however, also be an insulator with a metal coating or a metal with an insulating coating in which the thickness of the coating is clearly less than the total thickness.

The construction of monopolar fuel cell stacks can be further simplified if the plate element is formed as a laminate from an insulating layer and two conductive layers, which embed the insulating layer like a sandwich. Here too, the various layer thicknesses are not basically subject to any limitations. If this further development is used, electrolyte units and plate elements are simply stacked alternately to build up the stack.

In a particularly preferred further development, the plate element has at least one rib which extends from the frame region outwards. Via this at least one rib, electrical conductors can be more easily linked with each other electrically in a monopolar or bipolar arrangement. With the insulating plate element, no such ribs are needed, but they may occur for production reasons if the same device is used as for manufacturing the electrical conductors and if they are not generally a disturbance.

In a further development which particularly simplifies the electrical switching, ribs are provided on at least two opposite sides of the frame region. In this case, one type of electrical conductor can easily be switched in various orientations.

For monopolar arrangements in particular, a further development of the plate element is advantageous in which the ribs are offset against each other on opposite sides of the frame region. As a result, the electrical conductors can be installed in such a way that its ribs with respect to the ribs of the two adjoining electrical conductors in each case are offset and are thus not a hindrance in the case of contacting with one of the next-but-one electrical conductors.

The fuel cell stack assembly according to the invention comprises a membrane electrode unit (MEA) which is connected at least on one side with the conductive side of a plate element formed as an electrical conductor. Because of the connection, the fuel cell stack assembly has a higher mechanical stability than the individual elements, making the building of the stack easier. Moreover, if the fuel cell stack assembly is prefabricated, a better electrical contact can, under some circumstances, be achieved between the electrolyte device and the electrical conductor than is possible if the electrical conductor plate elements and the electrolyte device are simply placed next to each other.

BRIEF DESCRIPTION OF THE DRAWINGS

In the following, the invention is described on the basis of particularly preferred embodiments and with reference to the attached figures.

The following are shown:

FIG. 7 shows a further preferred embodiment of the plate element according to the invention as a current remover device in a bipolar stack;

FIG. 8 shows a fluid-insulating intermediate plate for the current remover device shown in FIG. 7.

DETAILED DESCRIPTION OF THE INVENTION

Figure 1:
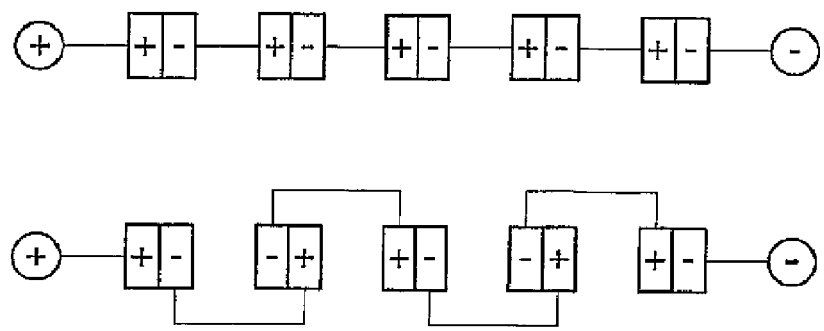
FIG. 1 shows the qualitative difference between a bipolar and a monopolar arrangement.
Figure 2:
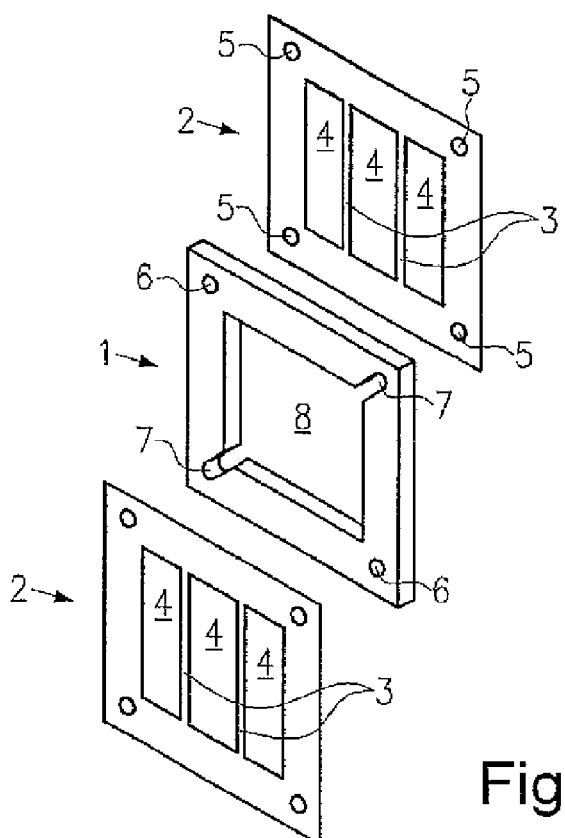
FIG. 2 shows the formation of a fluid chamber for a monopolar arrangement according to the state of the art.

FIGS. 1 and 2 have already been described in the introduction.

Figure 3:
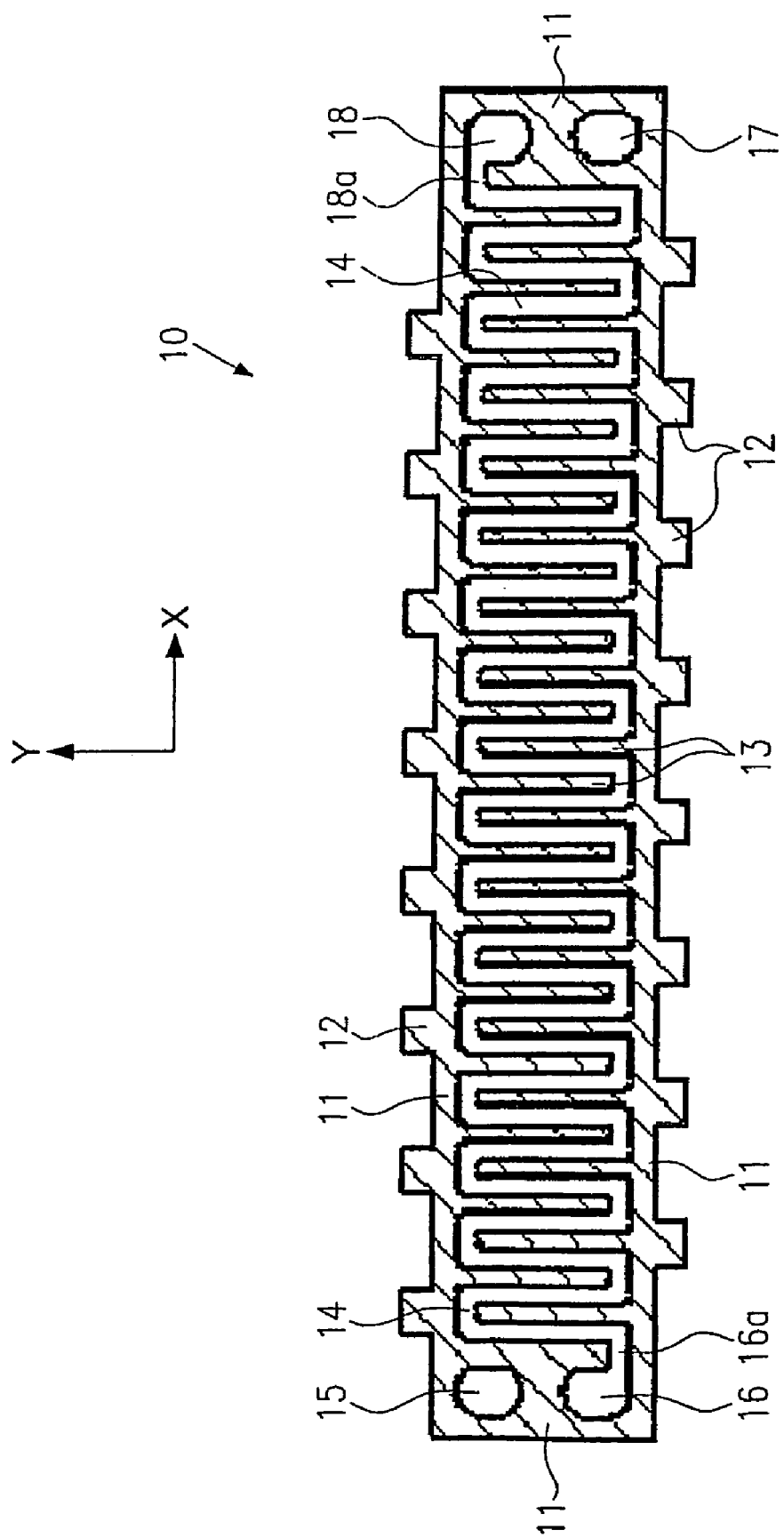
FIG. 3 shows a plate element in accordance with the present invention.

FIG. 3 shows a preferred embodiment of the plate element 10 according to the invention.

The plate element 10 can be made from an electrically conductive material (generally metal) and may be used in this embodiment as a current collector for bipolar or monopolar fuel cell stacks.

It has a circumferential frame region 11, whereby ribs 12 extend from two opposite sides of the frame region 11 outwards and webs 13 inwards. The webs 13 do not extend as far as the opposite side of the frame and are arranged on an alternating basis so that a meandering channel 14 is defined by the recesses between the webs 13. In the frame region 11, four bore holes 15, 16, 17, 18 are also provided, of which two diametrically opposite bore holes 16 and 18 are connected via openings 16a and 18a with the meandering channel 14.

When installed in a stack, part of the frame region 11 and the webs 13 are in electrical contact with the MEA and are used to conduct power. At the same time, the webs 13 are also used for even fluid distribution across the active surface and for fluid guidance across this surface. The fluid is fed via one of the two bore holes 16, 18, which are connected via the openings with the meandering channel 14, flows through this channel 14 and is removed again via the other bore hole. Because of the guided flow, there are no stagnation regions with reduced fluid exchange, which gives greater efficiency. In addition, the flow guidance guarantees locational independence when the stack is used.

In an embodiment preferred for monopolar arrangements (but also usable for bipolar arrangements), the ribs on the one side which extend outwards are offset against the ribs on the other side in such a way that with a juxtapositioning of the shown plate element 10 and a further plate element 10, which is rotated by 180° with respect to the x or y axis indicated in the figure and positioned in such a way that the bore holes of the two plate elements are in line, the ribs of the two plate elements do not come into contact with each other.

For monopolar arrangements, it is moreover preferred that, in the event of a rotation of the plate element 10 by 180° in the paper level, when the bore hole 17 lines up with bore hole 15 (and vice versa) and bore hole 18 lines up with bore hole 16 (and vice verse), the ribs extending outwards from the one side do not cover the original position of the ribs on the other side, but instead also are positioned between these. This means that it is possible only to use one type of electrical conductor to build up the entire monopolar stack.

The electrical conductor shown can be, for example, stamped from a metal plate or a metal sheet and can thus be made cheaply.

Electrically insulating intermediate plates for monopolar arrangements have the same structure as the electrical conductor shown in FIG. 3 as regards the bore holes and the flow field. The ribs of the electrical conductors extending outwards are not necessary with the insulating intermediate plates (see FIG. 5). However, it should be pointed out that these ribs would not be a hindrance with the insulating intermediate plates so that if necessary one and the same device can be used to manufacture the electrical conductors and the insulating intermediate plates.

As an alternative to the insulating intermediate plate, in addition to the pure metal plates, it is also possible to use metal plates coated on one side with an insulating material (or insulating plastic plates coated with a metal), which are structured as shown in FIG. 3. In these cases, no separate seals for the mutual insulation of adjacent electrical conductors need to be produced, which further cuts manufacturing costs, simplifies assembly and further reduces the volume of the stack (for more details, please see the description for FIG. 6).

Figure 4:
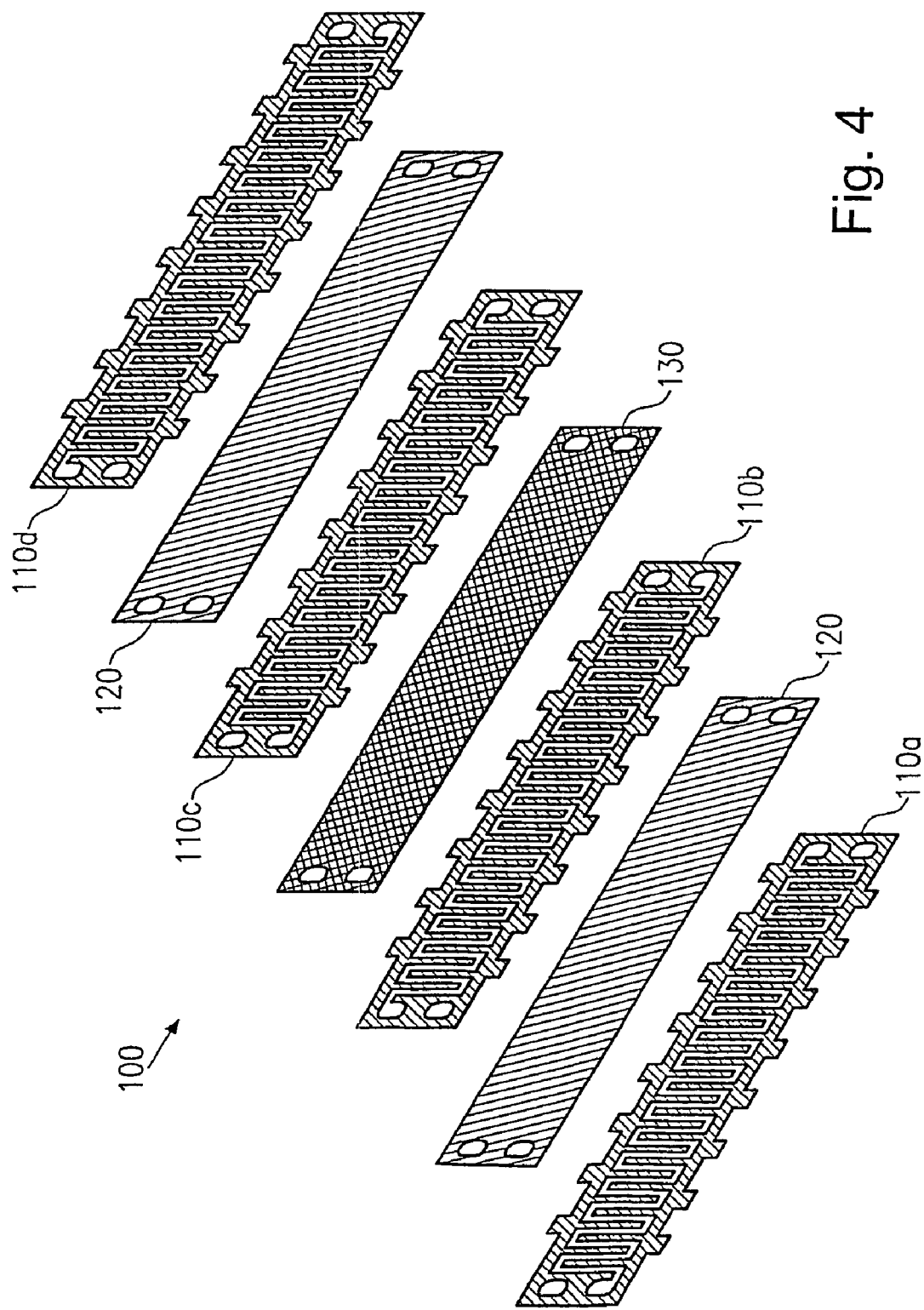
FIG. 4 shows a bipolar arrangement using plate elements according to the invention.

FIG. 4 shows—in an exploded view and sectionally—a fuel cell stack in a bipolar arrangement 100 with the electrical conductors of FIG. 3.

Of the four electrical conductors 110a, 110b, 110c, 110d, the electrical conductors 110a and 110c on the one side, and the electrical conductors 110b and 110d on the other side are identically aligned. If, without restriction of generality, it is assumed that electrical conductor 110a is the cathode-side electrical conductor, then electrical conductor 110b is an anode-side electrical conductor, electrical conductor 110c is a cathode-side electrical conductor and electrical conductor 110d in turn is an anode-side electrical conductor. The electrical conductors are separated from each other by intermediate plates 120 or through electrolyte devices (MEA) 130. The arrangement 120-110b-130 defines the anode region of a cell unit, whilst arrangement 130-110c-120 forms the cathode region of this cell unit.

The intermediate plates 120 are used for the separation of neighbouring fluid chambers, i.e. the separation of cathode and anode regions. They must prevent a mixture of cathode and anode fluids, but do not need to be electrically insulating, so that, for example, they could also consist of a thin metal foil.

As already mentioned, the arrangement 120-110b-130-110c-120 forms a cell unit or—by analogy with FIG. 1—a voltage element. To switch the stack section shown—by analogy with the upper part of FIG. 1—the current collectors 110a and 110b, and the current collectors 110c and 110d are contacted with each other via the ribs provided for this purpose. The directly adjoining current collectors of various cell units should therefore be preferably laid out here in such a way that these ribs are aligned with each other.

Figure 5:
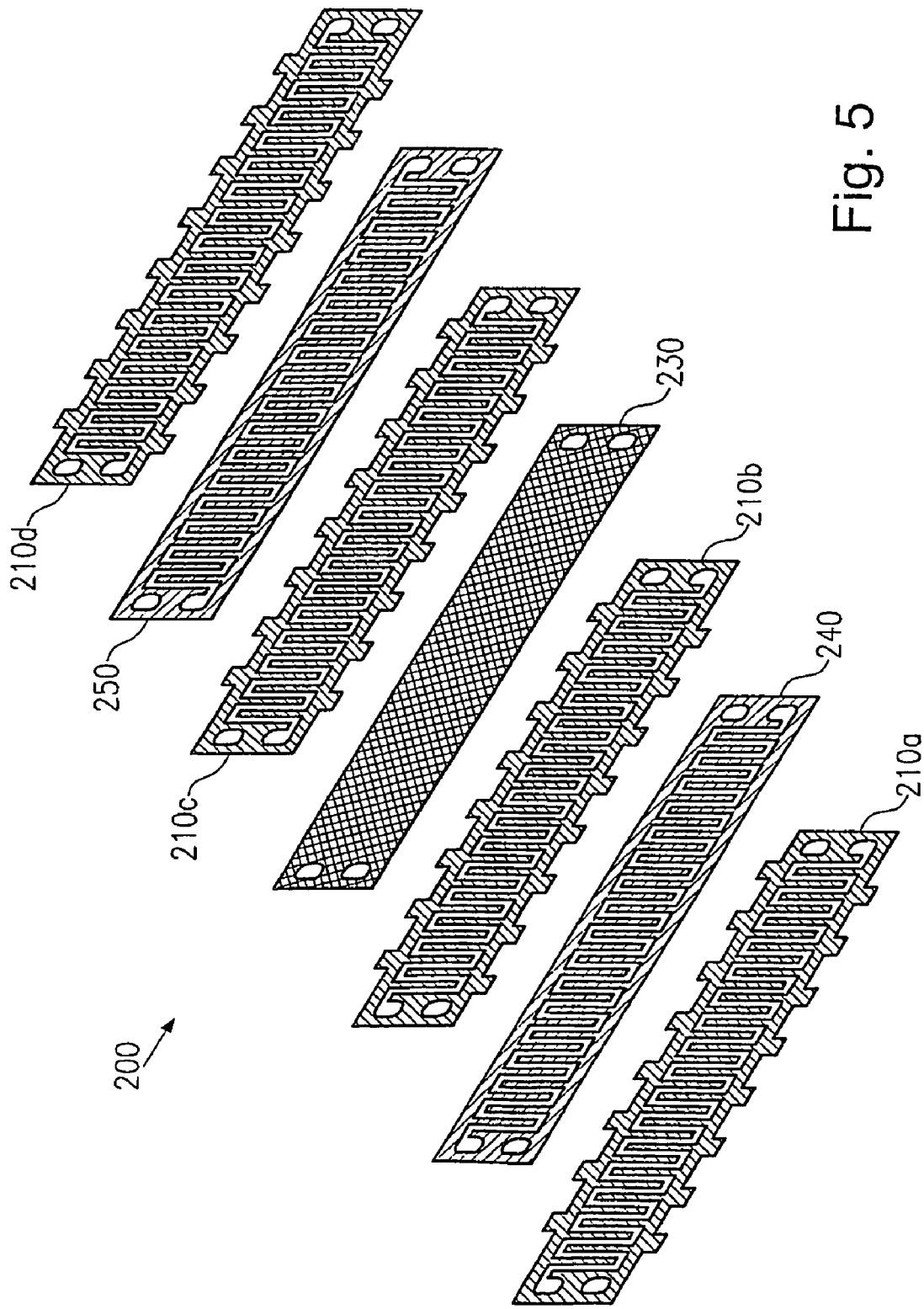
FIG. 5 shows a monopolar arrangement using plate elements according to the invention.

FIG. 5 shows—in an exploded view and sectionally—a fuel cell stack in a monopolar arrangement 200 with the electrical conductors of FIG. 3.

As with FIG. 4, this also shows four electrical conductors 210a, 210b, 210c and 210d. If, without restriction of generality, it is assumed that electrical conductors 210a and 210b are anode-side electrical conductors, then electrical conductors 210c and 210d are cathode-side electrical conductors.

The electrical conductors 210b and 210c are separated from each other by an electrolyte/electrode device, such as a membrane electrode unit (MEA) 230. The arrangement 240-210b-230 defines the anode region of a cell unit, whilst the arrangement 230-210c-250 forms the cathode region of this cell unit.

The intermediate plates 240 and 250 are used for the mutual electrical insulation of the electrical conductors 210a and 210b or 210c and 210d. For this reason, the webs of the intermediate plates 240 and 250 must be exactly aligned with those of the adjoining electrical conductors. Anode regions or cathode regions adjoining each other in pairs form in each case a common anode chamber or cathode chamber which are in each case closed on both sides by an electrolyte device 230.

The arrangement 240-210b-230-210c-250 forms a cell unit or—by analogy with FIG. 1—a voltage element. The switching is by analogy with the lower part of FIG. 1: to switch the stack section shown, for example, the anode-side current collector 210b and the cathode-side current collector 210d of the subsequent cell unit are electrically connected with each other (contacted) via the aligned ribs. The anode-side current collector 210a is contacted with the next cathode-side current collector on the left (not shown), whilst the cathode-side current collector 210d is contacted with the next anode-side current collector on the right (not shown), and so on. This contacting in pairs can be made simpler by ensuring that the ribs to be connected with each other are aligned flush. The current collector elements are therefore preferably made in such a way that the connecting ribs of each current collector are flush with those of the next-but-one current collector, whilst the connecting ribs of immediately adjacent current collectors are offset (not flush with each other). As shown in FIGS. 3 and 5, this can be achieved through suitable formation with a single type of current collector which is used each time in a different orientation.

Figure 6:
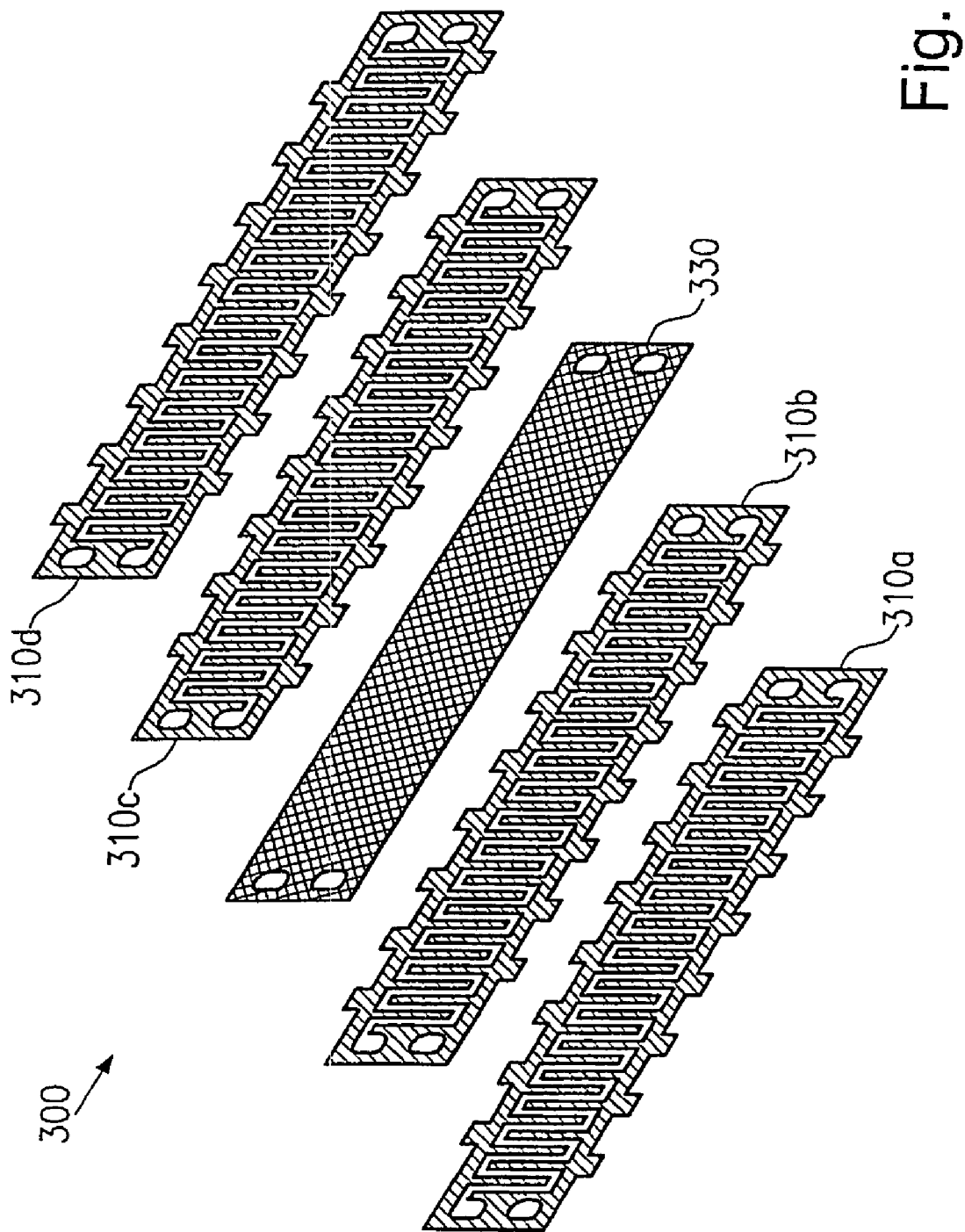
FIG. 6 shows a further monopolar arrangement using plate elements according to the invention.

As FIG. 6, which is based on FIG. 5, shows, a simplified construction of a monopolar stack can be achieved if electrical conductors are used which are formed as laminates, whereby one side is conductive and the other side is insulating.

For example, the electrical conductor shown in FIG. 3 can be coated on one side with an insulating material. In FIG. 6, the sides of electrical conductors 310b and 310d facing the viewer are to have a coating of this type. Through an alternating arrangement of such coated electrical conductors with uncoated electrical conductors in which the coated side is always turned to the adjoining uncoated electrical conductors, a monopolar stack can be constructed without the use of separate insulating intermediate plates, which represents a not inconsiderable simplification in terms of construction. In addition, the insulating coating can be thinner than that of the insulating intermediate plates made as separate units so that the total volume of the stack can be reduced.

It should be pointed out that in addition the sides of the electrical conductors 310a and 310c facing away from the viewer can also have such an insulating coating, even if this is basically not necessary. In addition to providing an even better guarantee of the electrical insulation of adjacent cell units, this can also simplify the putting together of the stack: adjacent electrical conductors must then always be put together in such a way that the fluid flow devices (bore holes, openings, channels) cover each other and the insulating layers are immediately next to each other.

In principle, there are no preconditions as regards the thickness of the insulating part and the conductive part of a laminate of this type. If there are no other reasons (e.g. mechanical stability, electrical conductivity) to prevent it, an electrical conductor of this type can therefore consist just as well essentially of insulating material which is coated on one side with a conductive layer.

A further simplification of the construction of a monopolar stack can be achieved by laminates which have an insulating layer embedded between two conductive layers (e.g. metal layers), i.e. which integrate, for example, the plate elements 210a, 240, 210b of FIG. 4 in a plate element. The stack can then be built up simply as an alternating arrangement of laminates and electrolyte devices.

FIG. 7 shows a further preferred embodiment of the plate element according to the invention and its alternating arrangement for the construction of a bipolar stack 400 (electrolyte devices and intermediate layers which separate neighbouring anode and cathode regions from each other have been left out for the sake of simplicity). The plate elements 410a and 410b only differ in their orientation. In comparison with similar structural features of the embodiment in FIG. 3, reference symbols increased by 400 have been used.

The dotted line of the plate element 410a sketched on the top right of the figure divides the plate element into a frame region and an inner region.

The frame region has a plurality of bore holes 415, 416, 417, 418, of which the bore holes 416 and 418 are connected in pairs via openings with recesses in the inner region of the plate element. All the bore holes are used for fluid guidance along the stack axis (at right angles to the plate level). Bore holes 416 and 418 are also used for fluid guidance at right angles to the stack axis. For this, they are joined in pairs via openings with recesses 414 in the inner region of the plate element, which define a plurality of parallel channels. These channels 414 are separated from each other by webs 413 which are used for current conduction with a plate element used as an electrical conductor (as is the case with the bipolar arrangement). The webs are joined here with opposite frame regions. Between every pair of plate elements, either an electrolyte device or a separating plate 420 is inserted, in the form and structure shown in FIG. 8. Bore holes 425, 426, 427, 428 in the outer region of the separating plate 420 (and also of the electrolyte device, not shown) are aligned in the stack exactly with the corresponding bore holes 415, 416, 417, 418 of the plate elements 410a, 410b.

In the example in the drawing, for example, the plate elements 410a define anode chambers, whilst the plate element 410b shows a cathode chamber. Bore holes 415 and 417 of the upper plate element 410a are used in this case to guide the cathode fluid, whilst bore holes 416 and 418 are used to guide the anode fluid and supply the anode fluid into the anode chamber defined by the inner region.

The plate elements can be made from an electrically conductive material and used in this form as current collectors for bipolar or monopolar fuel cell stacks. In contrast to FIG. 7, in the latter case the current collectors must always be aligned the same in pairs and neighbouring pairs turned in each case by 90°. If all the current collectors (or at least one current collector of each pair) are provided with an insulating coating on one side, then a monopolar arrangement corresponding to FIG. 6 is possible. If the current collectors are conductive on both sides, electrically insulating plate elements with the structure shown in FIG. 7 will be needed in addition in order to allow a construction of a monopolar arrangement corresponding to FIG. 5. The electrolyte device for the monopolar arrangement, on the other hand, is not different from that for the bipolar arrangement (cf. FIG. 8).

The present invention and its advantages have just been explained on the basis of preferred embodiments. The scope of protection of the present invention, however, is defined solely by the following patent claims.

The invention claimed is:

1. A plate element for a fuel cell stack in a monopolar arrangement, comprising:
   a frame region and at least one inner region which is enclosed by the frame region,
   a plurality of webs which extend from the frame region into the at least one inner region and define, in the at least one inner region, a flow guidance structure which is formed by recesses between the webs, such that fluid regions within anode pairs of the fuel cell stack are not separated and such that fluid regions within cathode pairs of the fuel cell stack are not separated, and at least four bore holes in the frame region, of which at least two are connected with the flow guidance structure, wherein the plate element is made as a laminate of an insulating layer and two conductive layers which embed the insulating layer as if in a sandwich, such that the anodes and cathodes within the anode and cathode pairs are electrically insulated from each other.

2. A plate element according to claim 1 in which the flow guidance structure contains at least one meandering flow channel.

3. A plate element according to claim 1 which consists of a conductive material.

4. A plate element according to claim 3 which consists of a metal or a metallic compound.

5. A plate element according to claim 1 which consists of an insulating material.

6. A plate element according to claim 1 which is made as a laminate of a conductive layer and an insulating layer.

7. A plate element according to claim 1 with at least one rib which extends from the frame region outwards.

8. A plate element according to claim 7 with ribs on at least two opposite sides of the frame region.

9. A plate element according to claim 8 in which the ribs are positioned offset to each other on opposite sides of the frame region.

10. A fuel cell stack assembly, comprising:
    a membrane electrode unit which is connected at least on one side with the conductive side of a plate element according to claim 1.

11. A plate element according to claim 2 which consists of a conductive material.

12. A plate element according to claim 2 which consists of an insulating material.

13. A plate element according to claim 2 which is made as a laminate of a conductive layer and an insulating layer.

14. A plate element according to claim 2 with at least one rib which extends from the frame region outwards.

15. A plate element according to claim 3 with at least one rib which extends from the frame region outwards.

16. A plate element according to claim 5 with at least one rib which extends from the frame region outwards.

17. A plate element according to claim 6 with at least one rib which extends from the frame region outwards.

18. A plate element according to claim 1 with at least one rib which extends from the frame region outwards.

* * * * *